May 20, 1952  O. S. FIELD  2,597,785
LATCHING MEANS FOR ELECTRIC MOTOR SHAFTS
Filed Aug. 3, 1948
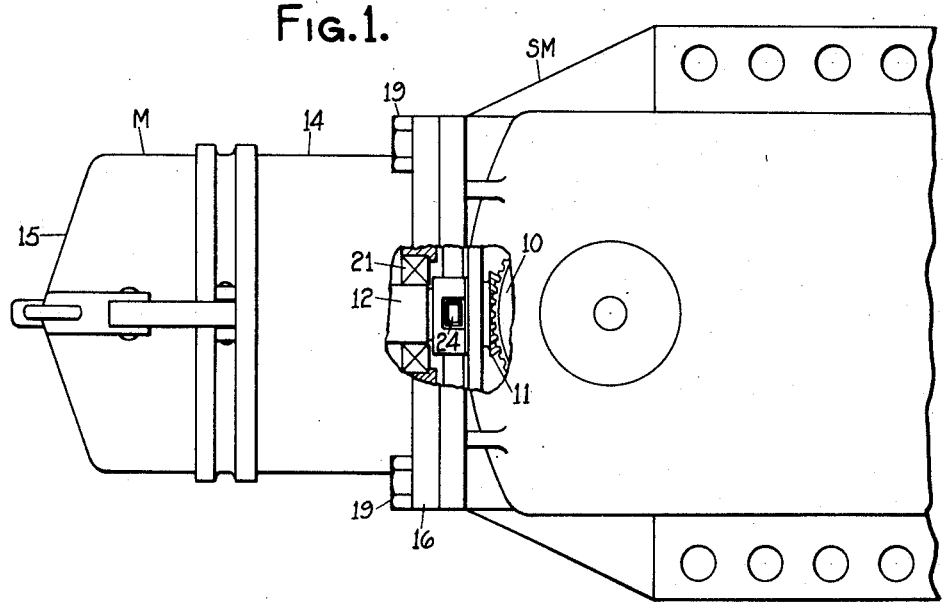
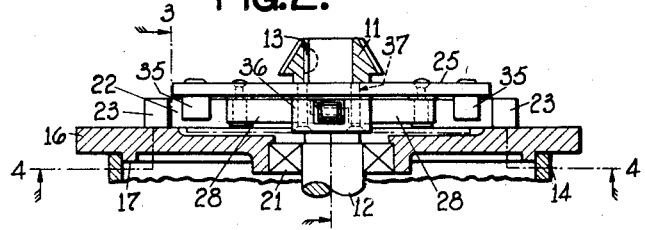
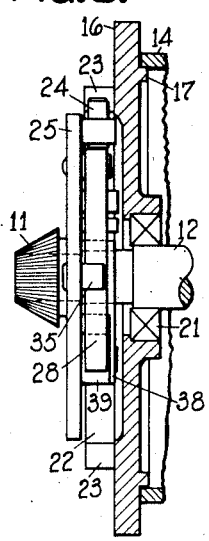
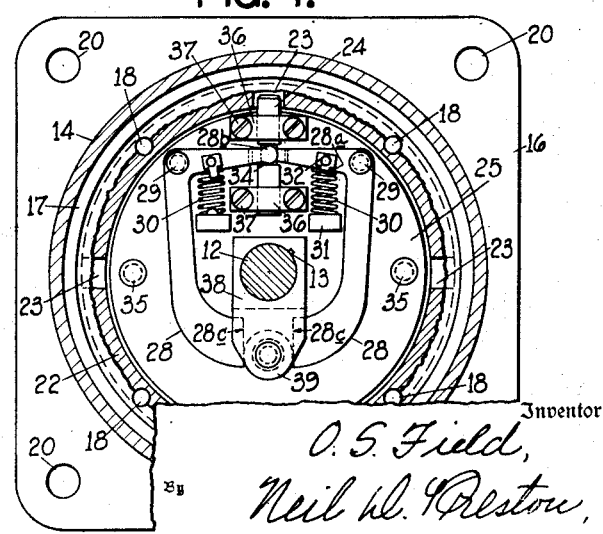
Inventor
O. S. Field,
Neil W. Preston,
his Attorney Patented May 20, 1952

2,597,785

UNITED STATES PATENT OFFICE 2,597,785

LATCHING MEANS FOR ELECTRIC MOTOR SHAFTS

Oscar S. Field, Rochester, N. Y., assignor to General Railway Signal Company, Rochester, N. Y.

Application August 3, 1948, Serial No. 42,221

2 Claims. (Cl. 192—8)

This invention relates to means for latching an electric motor shaft to prevent creepage when the motor is inactive, and it more particularly pertains to a latch mechanism for automatically latching or unlatching a motor shaft when that shaft respectively ceases to rotate or its rotation is initiated in either direction.

In power operated track switches for railroads, the motors effecting the power operation of the track switches are normally inactive, and power is applied to such motors only when it is desirable to change the positions of the associated track switches. It is common practice to provide each of such motors with a brake that is normally effective to prevent creepage of the motor shaft but is released electromagnetically upon the energization of the motor. Thus the brake acts to prevent creepage of the motor shaft due to vibration that might permit the switch points to open.

An object of the present invention is to provide a more positive means for preventing creepage in the form of a positive latch to prevent movement of the motor armature in either direction when the motor is inactive.

Another object of the present invention is to reduce the power requirements for the power operation of track switches by substituting mechanically operated latches for the electrically actuated brakes.

Other objects, purposes, and characteristic features of the present invention will be obvious from the accompanying drawing, and will be pointed out as the description progresses.

In describing the invention in detail reference is made to the accompanying drawing wherein similar reference characters are used to designate corresponding parts throughout the several views, and in which:

Fig. 1 is a plan view of a power switch machine driven by a motor having an end plate carrying a latch mechanism;

Fig. 2 is a plan view of the motor end plate and latch mechanism shown partially in cross-section;

Fig. 3 is an elevational side view of the motor end plate and latch mechanism taken along the section line 3—3 of Fig. 2; and, Fig. 4 is an elevational view of the motor end plate and latch mechanism taken along the section line 4—4 of Fig. 2.

With reference to Fig. 1, the power switch machine SM is illustrated as being driven by the motor M wherein the bevel gear 10 of the switch machine SM is driven by the bevel pinion gear 11 which is keyed to the motor shaft 12 by the key 13 as shown in Fig. 2. The switch machine SM may be of any suitable type, such, for example, as the type shown in the patent to W. K. Howe No. 1,466,903, dated September 4, 1923. It is also to be understood that the latch mechanism can also be used in connection with the power operation of other devices.

The motor M comprises a shell 14, a cover 15 and an end plate 16, the cover 15 being provided according to usual practice for making wiring connections to the motor, the adjustment of brushes and the like.

As illustrated in Figs. 2 and 4, the end plate 16 is formed with a circular rib 17 for engagement within the shell 14, the end plate being suitably secured to the shell by through bolts or studs extending through the holes 18. The motor M in turn is secured to the switch machine SM by suitable bolts 19 which pass through holes 20 of the end plate 16.

The end plate 16 has a center opening in which a bushing 21 is secured to serve as a bearing for the shaft 12, and disposed about this center opening is a circular rib 22 having radial slots 23 formed therein spaced 90° from each other for the engagement of a catch 24 which is carried by a disk 25. The disk 25 is slidable rotatively on the motor shaft 12.

Pivoted on the disk 25 are two oppositely disposed L-shaped centrifuges 28 which are pivoted on the studs 29 that are suitably secured in the disk 25. With reference to Fig. 4, the right-hand centrifuge 28 is biased to a clockwise operated position by the spring 30 which is held under compression between a lug 31 formed in the disk 25 and the point 28a of the centrifuge 28. A suitable detent 32 is secured at this point 28a to the centrifuge 28 for the purpose of locating the spring 30 at this point in the centrifuge. Similarly the left-hand centrifuge 28 is biased to a counter-clockwise rotated position by a spring 30.

The centrifuges 28 are both formed with ball shaped ends 28b which are offset so as to be disposed in overlapping relationship within the slot 34 of the latch 24 so as to actuate the latch radially with respect to the shaft 12 as either of the centrifuges 28 is actuated about its pivot point 29. The centrifuges 28 are limited in their actuation about their pivot points 29 by suitable stops 35 which are secured to the disk 25. The latch 24 which is actuated by the centrifuge 28 is actuated through channel shaped brackets 36 which are suitably secured to the disk 25 as by the screws 37.

A cam 38 is keyed on the shaft 12 as by the key 13 which also keys the pinion gear 11, and such cam carries a roller 39 which extends between the surfaces 28c of the oppositely disposed centrifuges 28 below the shaft 12 so as to actuate one or the other of such centrifuges in accordance with the rotation of the shaft 12.

When energy is applied to the motor M, the shaft 12 starts to rotate the cam 38, and thus the roller 39 of the cam 38 tends to rotate the disk 25 because of its contact with the surface 28c of one of the centrifuges 28. Because of the latch 24 being in engagement with one of the notches 23, however, the disk 25 cannot rotate, and thus one or the other of the centrifuges 28 (dependent upon the direction of rotation) is actuated about its pivot point to an extent to further compress the spring 30 and disengage the latch 24 from the slot 23. Subsequent to such disengagement, the disk 25 is rotated with the shaft 12 and its rotation causes the centrifuges 28 to be thrown outwardly against the stops 35 and thus hold the latch 24 in its retracted, or disengaging position to permit the free rotation of the shaft 12 of the motor so as to permit the switch machine SM to be driven by the pinion gear 11.

When energy is removed from the control circuit for the motor, the centrifuges 28 maintain the catch 24 disengaged from the slots 23 until the speed of the shaft 12 is reduced to a very low speed so that the catch 24 does not stop the shaft 12 too abruptly. By the parts of the latch mechanism carried by the disk 25 having either a greater or lesser inertia than the inertia of the rotor shaft 12, the cam 38 is effective to aid in retarding the engagement of the latch 24 in a slot 23 because of its bearing against the surface 28c of one of the centrifuges 28. As the speed of the shaft 12 is reduced nearly to the point of stopping, the compression springs 30 actuate the latch 24 against the inner side of the circular rib 22, and thus the latch is effective to engage the next slot 23 that the latch 24 approaches so as to lock the shaft 12 against rotation until such subsequent time as the motor may be energized for operation of the switch machine to its opposite position.

It will be noted that in order to disengage the latch 24 from a slot 23, the shaft 12 must be rotated with sufficient torque to compress the springs 30. Thus it can be said that the shaft 12 is biased by the springs 30 to the latched position and force much greater than creepage due to vibration is required to disengage the latch and permit rotation of the shaft 12.

Having thus described a specific motor latching mechanism as one embodiment of the present invention, it is desired to be understood that this embodiment is shown and described to facilitate in the disclosure of the invention rather than to limit the number of forms which the invention may assume, and it is to be further understood that various adaptations, alterations, and modifications may be applied to the specific form shown to meet the requirements of practice without in any manner departing from the spirit or scope of the present invention except as limited by the appended claims.

What I claim is:

1. In a motor driven device, a motor shaft, a fixed end plate attached to the motor and having a bearing for said motor shaft, a circular flange constructed upon said end plate concentric with said motor shaft, a radial notch in said circular flange, a rotatable disk mounted on said motor shaft, a latch slideable radially on said disk, centrifuge members pivotally mounted upon said disk, said centrifuge members being so pivoted that they rotate outwardly by centrifugal force upon rotation of said disk and remain in such outward position until rotation of said disk nearly ceases, a projecting member on said motor shaft adapted to engage one or the other of said centrifuge members dependent upon the direction of rotation of said motor shaft, means for connecting one end of each of said centrifuge members to said latch, spring biasing means acting upon said last mentioned means to cause said latch to engage said notch when said motor shaft is not rotating, and a driven mechanism coupled to said motor shaft, whereby rotation of said motor shaft causes said projecting member to rotate one of said centrifuge members outwardly about its pivot point, thereby causing said latch to disengage said notch, with said centrifuge members remaining in their outwardly pivoted positions and holding said latch in a disengaged position until rotation of said disk nearly ceases.

2. A latch mechanism for preventing creepage of a motor shaft when the motor is deenergized comprising in combination, a motor shaft, a motor end plate forming a bearing for said shaft, said end plate having a plurality of radial slots formed therein, a disk rotatively mounted on said shaft, a latch disposed on said disk so as to be slidably operable radially with respect to said shaft to engaging or disengaging positions with respect to any one of said slots, oppositely disposed centrifuge members pivoted to said disk and both being operable by centrifugal action about their pivot points to actuate said latch to said disengaging position, a spring biasing means acting on said centrifuge members to normally actuate said latch to an engaging position but permitting centrifugal action on said centrifuge members to retain them in said latch disengaging positions upon rotation of said disk until such rotation has substantially stopped, a cam secured to said shaft and operable to engage one or the other of said centrifuge members dependent upon the direction of rotation of said shaft, pins on said disk limiting the angle of rotation of each of said centrifuge members about its pivot to allow only limited movement of said cam relative to said disk and thereby cause said disk to be driven by said motor shaft, and a driven device connected to said motor shaft, whereby the application of power to the motor for causing its operation in either selected direction causes a limited rotation of said cam with respect to said disk to initially actuate said centrifuge members to latch disengaging positions and to then drive said disk and said driven device in the same direction, and whereby said driven device cannot cause creepage of said motor shaft while the motor is deenergized and said latch is actuated to an engaging position.

OSCAR S. FIELD.

REFERENCES CITED

The following references are of record in the file of this patent:

UNITED STATES PATENTS

| Number | Name | Date |
| --- | --- | --- |
| 1,043,178 | Waite | Nov. 5, 1912 |
| 1,277,800 | Westfall | Sept. 3, 1918 |
| 1,354,752 | Horn and Watson | Oct. 6, 1920 |
| 1,415,300 | Borofsky | May 9, 1922 |
| 1,466,903 | Howe | Sept. 4, 1923 |
| 1,578,348 | Nicholson | Mar. 30, 1926 |
| 2,051,400 | Taylor | Aug. 18, 1936 |
| 2,339,232 | Moroney | Jan. 11, 1944 |

FOREIGN PATENTS

| Number | Country | Date |
| --- | --- | --- |
| 649,901 | France | Dec. 29, 1928 |
| 810,787 | France | Mar. 30, 1937 |